July 10, 1962     S. MILNER     3,043,622
MOVABLE SEAT

Filed Oct. 26, 1959     2 Sheets-Sheet 1

INVENTOR.
SAMUEL MILNER
BY Woodling and Krost,
ATTORNEYS

INVENTOR.
SAMUEL MILNER
BY Woodling and Krost,
ATTORNEYS

United States Patent Office 3,043,622
Patented July 10, 1962

---

3,043,622
MOVABLE SEAT
Samuel Milner, 2039 Warrensville Center Road,
South Euclid, Ohio
Filed Oct. 26, 1959, Ser. No. 848,694
10 Claims. (Cl. 297—240)

The invention relates in general to a movable seat having two parts for relative movement therebetween in a generally turning movement and more particularly to an auxiliary seat for an automobile or the like wherein the auxiliary seat has a top plate which both turns and moves in a first direction.

As automobiles become progressively lower, wider and more softly cushioned, they have become more difficult to enter and exit. The lowness of the automobile and more particularly the lowness of the doors together with the intrusion of the door frame and the steering wheel into the path of movement of a person's legs, has made it much more difficult to enter and exit automobiles in recent years. Numerous cities have had legislation regarding the door area and size of taxi-cabs, for example, in order to maintain some minimum standard to permit a person to enter or depart from a vehicle with a maximum of ease and dignity. Also, certain other designing attempts have been made such as cutting the doors partially into the roof line. One further attempt which has been made are seats which swivel partially outwardly in order to help gain entrance to the automobile seat and such swivel seats have partially solved the problem. Such seats are original equipment, and, of course, do not offer a solution to the millions of late model automobiles that are currently on the highways of the United States.

Accordingly, an object of the invention is to provide a movable seat which will enable a person to more easily sit on it or arise therefrom.

Another object of the invention is to provide an auxiliary movable seat for an existing automobile seat.

Still another object of the invention is to provide an auxiliary seat for an automobile which both turns and slides in a first direction, which, for example, might be toward the left for the left side of an automobile seat.

Another object of the invention is to provide an auxiliary seat which will not move forwardly directly, but which must first move in a lateral direction before it may move partially forwardly and the principal movement is sideways as well as turning to permit a person to initially sit in a normal straight ahead position on the turntable top portion of the seat and then twist to an angled position to arise from the seat.

Another object of the invention is to provide an economical and durable auxiliary seat for an existing automobile seat.

Other objects and a fuller understanding of the invention may be had by referring to the following description and claims, taken in conjunction with the accompanying drawings, in which:

Figure 4:
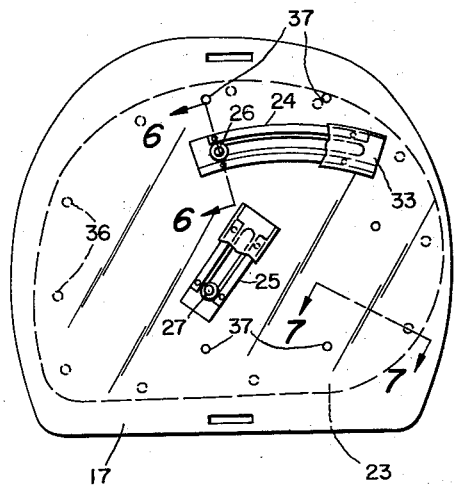
FIGURE 4 is a bottom view of the auxiliary seat with parts broken away for clarity.
Figure 5:
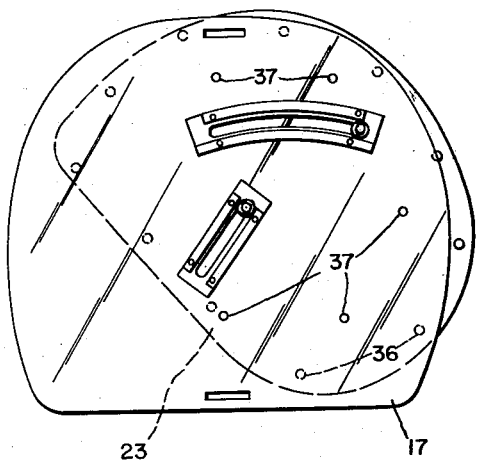
Figure 6:
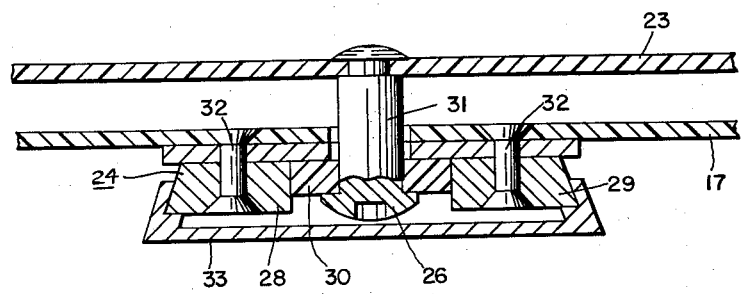
Figure 7:
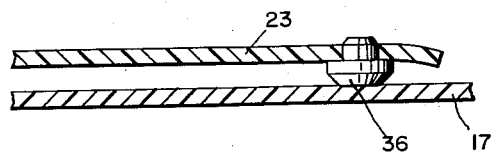

FIGURE 5 is a bottom view of the auxiliary seat with the top plate in a turned position; and FIGURES 6 and 7 are sectional views on lines 6—6 and 7—7, respectively, of FIGURE 4.

The drawing shows the movable seat 11 as adapted for one use merely for purposes of illustration; namely, as an auxiliary seat for an automobile seat 12 having a cushion 13 and a back rest 14. The movable seat 11 has a base plate 17 with slots 18 and 19 to receive a flexible strap 20 which may encompass the seat cushion 13 to fasten the movable seat base plate 17 to the cushion 13. A top plate 23 rests on the base plate 17 and is slidable and turnable with respect thereto. The base plate 17 and top plate 23 may be made from a reinforced hardened plastic material such as a thermo-setting or self-setting resin reinforced if desired, with netting, cloth or fibers, and, as such, may be formed into a slight curve to conform to the general curvature of the seat cushion 13. Guide and pivot means are provided inter-connecting the top plate 23 and base plate 17 and include first and second guideways 24 and 25 and first and second slide pivots 26 and 27. The first guideway 24 is more clearly shown in FIGURE 6 and includes first and second tracks 28 and 29 spaced apart and generally parallel. The tracks 28 and 29 are closed at the ends to form an enclosed guideway for a roller 30 which is mounted on a rivet 31 acting as an axle shaft and headed and fixed to the top plate 23. The roller 30 may also be of hardened plastic material and is journalled on the rivet shank 31. The tracks 28 and 29 may be of metal, if desired, and fastened in any suitable manner, such as by rivets 32 to the base plate 17. The roller 30 and rivet 31 constitute the first sliding pivot 26 since there is a pivot connection with respect to the top plate 23 and a sliding or rolling connection with respect to the base plate 17. A cover 33 may be provided which snaps into place over the outside edges of the tracks 28 and 29 in order to cover the movable roller 30 so that this movement will not damage the seat cushion 13. The second guideway 25 is constructed in a manner similar to the first guideway 24.

A first set of hardened plastic buttons 36 is fixed in the top plate 23 around the periphery thereof, and as best seen in FIGURE 7, these have rounded lower faces to bear against the base plate 17. A second set of hardened plastic buttons 37 are fixed in the base plate 17 to bear against the top plate 23 and are spaced inside the first set of buttons 36. These sets of buttons support the top plate 23 and minimize sliding friction as the top plate 23 is slid and turned. These buttons 36 may be made from nylon or other suitable material and it has been found that these fixed buttons with the rounded heads are just as satisfactory and more economical and trouble free than balls or other rolling elements.

Figure 1:
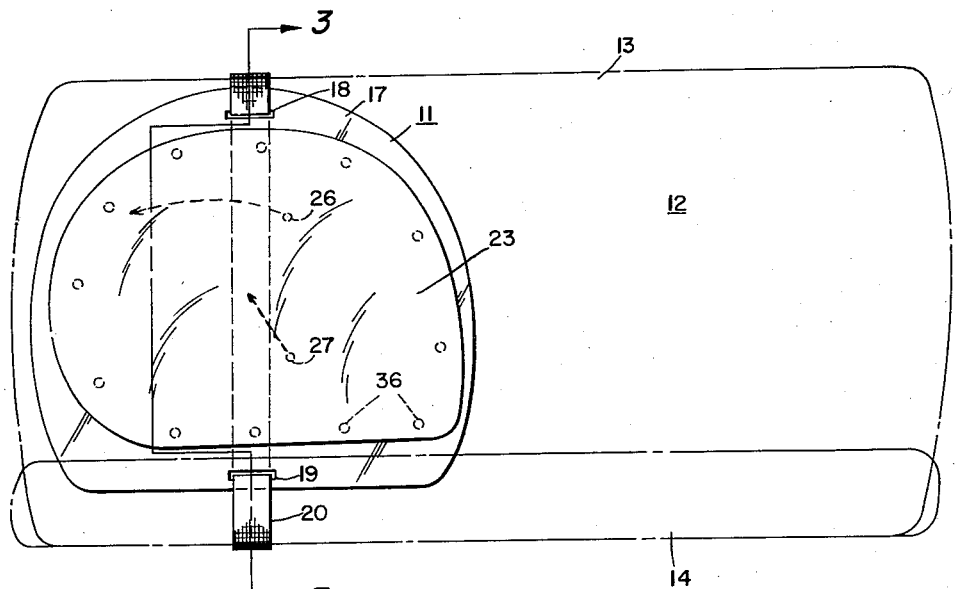
FIGURE 1 is a plan view of an automobile seat with the movable seat of the present invention fastened thereto.
Figures 2, 3:
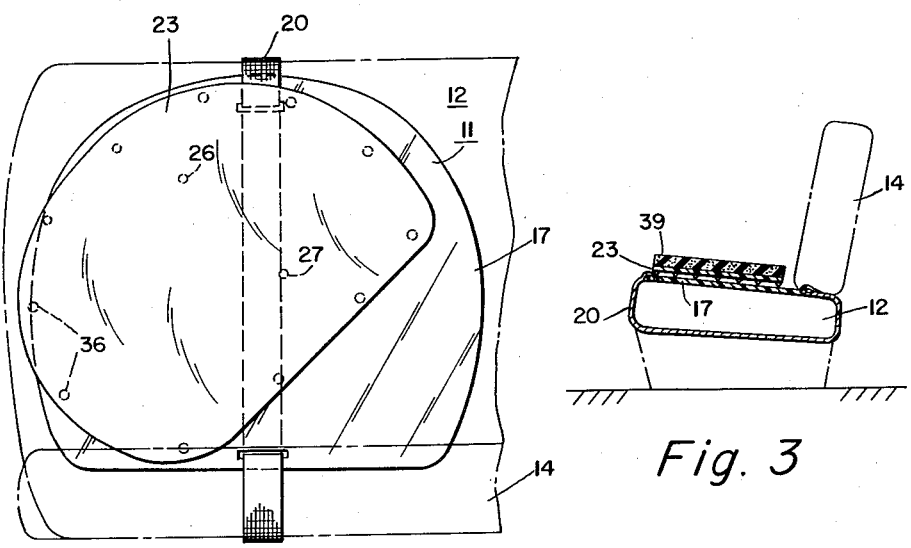
FIGURE 2 is a view similar to FIGURE 1, but with the auxiliary seat moved to a turned position.
FIGURE 3 is a sectional view on line 3—3 of FIGURE 1.

The top plate 23 may support a pad or cushion 39 for supporting a person, as shown in FIGURE 3. The top plate 23 is guided in sliding and turning movements and has a normal position as shown in FIGURE 1 and a turned position as shown in FIGURE 2. FIGURES 4 and 5 show the bottom views of the movable seat 11 in the normal and turned positions, respectively. The sliding pivots 26 and 27 are visible in FIGURES 1 and 2 which have the cushion 39 removed. In the normal position shown in FIGURE 1, the first sliding pivot 26 is at a first point which is at the right end of the first guideway 24. Also, in this normal position of FIGURE 1 the second sliding pivot 27 is at a first point which is the rearmost point of the second guideway 25. In the turned position of FIGURE 2 the first sliding pivot 26 is at a second point at the left end of the first guideway 24, and the second sliding pivot 27 has moved to a second point at the most forward and leftward position of the second guideway 25. The first and second sliding pivots 26 and 27 may be considered as having first and second paths of movement as the top plate 23 is turned and slid from the normal to the turned position. These first and second paths of movement are, of course, dictated by the first and second guideways 24 and 25, respectively. The first path of movement of the first sliding pivot 26 is from the first point to the second point. This first point mentioned above is slightly to the right of the lateral center of the base plate 17 and approximately ¼ the front-to-back dimension of the base plate. The second point is generally in a first direction transverse thereto which is to the left in the embodiment shown since this movable seat 11 is for the left side of the automobile seat 12. This first path is slightly convexly curved toward the front of the base plate 17 and the second point or terminal end of this first path is approximately at the same front-to-back position as the first point.

The first guideway 24 is approximately twice the length of the second guideway 25 and, accordingly, the first path of movement is approximately twice the length of the second path of movement of the second sliding pivot 27. The first point of the second path; namely, the initial position of the sliding pivot 27 in the normal position shown in FIGURE 1, is slightly to the right of the lateral center of the base plate 17 and approximately ⅔ the front-to-back seat dimension of the base plate. The second point or terminal point of the second path is approximately at the front-to-back center of the base plate and is forward and to the left of the first point along an angle of about 20 degrees to the left of this first point. This second path may be substantially straight.

These first and second paths of movement of the front and rear points of reference or pivot points 26 and 27 have been found to provide a very reliable, smooth acting and satisfactory movable auxiliary seat. The fact that the first path is generally perpendicular to the front-to-back dimension, that is, generally transverse or toward the side, means that any sudden stops will not cause the top plate 23 to move forwardly. The fact that the first sliding pivot 26 co-acts with the first guideway 24 only in a generally sideways direction means that the top plate 23 is generally locked against movement in a forward direction.

In order to operate the movable seat 11 the person sitting on the seat merely opens the door and turns his body in the first direction toward the door opening, which is toward the left in the embodiment shown, and this leftward twisting movement causes the sliding pivots 26 and 27 to move along the guideways 24 and 25. This moves the pivot points 26 and 27 along the first and second paths of movement, respectively, and the front of the seat moves generally toward the left and the rear of the seat moves both forwardly and to the left. The turned position, as shown in FIGURE 2, is thus one which places the top plate 23 closely adjacent the edge of the seat cushion 13. The person thus may easily step out of the automobile. Also, the turned position of the top plate 23 tends to wedge the cushion 39 underneath the seat back 14 so that the top plate 23 stays in the turned position as shown in FIGURE 2. Then when one again reenters the automobile, one merely sits on the cushion 39 in a very natural and normal sitting maneuver and then twists his body just as easily as in a swivel chair and at the same time lifting his feet into the automobile and this twisting movement returns the top plate 23 to the normal position as shown in FIGURE 1.

The first guideway 24 is preferably constructed such that the first and second tracks 28 and 29 have a transverse distance between them at the mid portion which is greater than the diameter of the roller 30. This prevents any binding as the roller 30 moves along the first guideway 24. Also, the transverse distance between the tracks 28 and 29 at each end of this guideway 24 is substantially equal to the diameter of the roller 30 and this establishes a minimum lost motion between the base and top plates 17 and 23 at both the normal and turned positions of the top plate 23. This assures, especially in the normal position, that the top plate 23 does not move forwardly and backwardly on the seat cushion 13 with acceleration and deceleration of the automobile.

The length of the guideways and their positions may be changed slightly so as to permit different amounts of turning movement. Approximately 60 degrees of movement of the top plate 23 has been shown, but as little as 45 degrees may be satisfactory under many conditions and as much as 90 degrees may easily be provided.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A movable seat, comprising, in combination, a base plate, a top plate, a first guide connected to one of said plates, a first sliding pivot operably connected to the other of said plates and slidable in said first guide, second guide and pivot means interconnecting said base and top plates, said top plate being for seating support of a person, normal and turned positions of said top plate relative to said base plate with said turned position being in the order of 45° to 90° in a first direction, said guide, sliding pivot and guide and pivot means establishing at least part of first and second paths of movement, respectively, of front and rear points on said top plate, said front point being generally at the lateral center of said top plate near the front thereof and movable in said first path initially substantially sideways in said first direction as said top plate is moved from said normal to said turned position to prevent forward movement of said top plate and thus establishing a lock against initial forward movement of said top plate, and said rear point being generally at the lateral center of said top plate near the rear thereof and movable in said second path generally forward and in said first direction as said top plate is moved from said normal to said turned position.

2. A movable seat, comprising, in combination, a base plate, a top plate, first and second guides connected to one of said plates, first and second sliding pivot means operably connected to the other of said plates and slidable in said first and second guides, respectively, normal and turned positions of said top plate relative to said base plate, said first and second guides establishing at least part of first and second paths of movement, respectively, of front and rear points on said top plate, said front point being generally at the lateral center of said top plate near the front thereof and movable in said first path initially substantially sideways in said first direction as said top plate is moved from said normal to said turned position to prevent direct forward movement of said top plate and thus establishing a lock against initial forward movement of said top plate, said rear point being generally at the lateral center of said top plate near the rear thereof and movable in said second path generally forward and in said first direction as said top plate is moved from said normal to said turned position, said guides establishing movement of all points on said top plate relative to said base plate as said top plate is moved from said normal to said turned position.

3. A movable seat, comprising, in combination, a base, a top plate, first and second guides connected to one of said plates, first and second sliding pivots operably connected to the other of said plates and slidable in said first and second guides, respectively, said top plate being for seating support of a person, normal and turned positions of said top plate relative to said base plate with said turned position being in the order of 45° to 90° in a first direction, said first and second guides establishing at least part of first and second paths of movement, respectively, of front and rear points on said top plate, said front point being generally at the lateral center of said top plate near the front thereof and movable in said first path initially substantially sideways as said top plate is moved from said normal to said turned position to prevent direct forward movement of said top plate and thus establishing a lock against forward movement of said top plate, and said rear point being generally at the lateral center of said top plate near the rear thereof and movable in said second path generally forward and in said first direction as said top plate is moved from said normal to said turned position.

4. An auxiliary movable seat for an automobile seat, comprising, in combination, a base plate, said base plate adapted to be placed on an automobile seat, a top plate, first and second guides connected to one of said plates, first and second sliding pivots operably connected to the other of said plates and slidable in said first and second guides, respectively, said top plate being for seating support of a person, normal and turned positions of said top plate relative to said base plate and to said automobile seat with said turned position being in the order of 45° to 90° in a first direction, said first and second guides establishing at least part of first and second paths of movement, respectively, of front and rear points on said top plate, said front point being generally at the lateral center of said top plate near the front thereof and movable in said first path generally in said first direction as said top plate is moved from said normal to said turned position and movable initially substantially perpendicularly to the front-to-back dimension of said base plate to prevent direct forward movement of said top plate, and said rear point being generally at the lateral center of said top plate near the rear thereof and movable in said second path generally forward and in said first direction as said top plate is moved from said normal to said turned position.

5. An auxiliary movable seat for an automobile seat, comprising, in combination, a base plate, means to fasten said base plate to said automobile seat, a top plate, first and second guides connected to one of said plates, first and second sliding pivots operably connected to the other of said plates and slidable in said first and second guides, respectively, said top plate being for seating support of a person, normal and turned positions of said top plate relative to said base plate and to said automobile seat with said turned position being in the order of 45° to 90° in a first direction, said first and second guides establishing at least part of first and second paths of movement, respectively, of front and rear points on said top plate, said front point being generally at the lateral center of said top plate near the front thereof and movable in said first path initially substantially perpendicularly to the front-to-back dimension of said base plate to prevent direct forward movement of said top plate, said first path being approximately twice the length of said second path and being slightly convexly curved toward the front of said base plate and extending in said first direction as said top plate is moved from said normal to said turned position, and said rear point being generally at the lateral center of said top plate near the rear thereof and movable in said second path generally forward and partially in said first direction as said top plate is moved from said normal to said turned position.

6. An auxiliary movable seat for an automobile seat, comprising, in combination, a base plate, means to fasten said base plate to said automobile seat, a top plate, first and second guides connected to one of said plates, first and second sliding pivots operably connected to the other of said plates and slidable in said first and second guideways, respectively, said top plate being for seating support of a person, normal and turned positions of said top plate relative to said base plate and to said automobile seat with said turned position being in the order of 45° to 90° in a first direction, said first and second guides establishing at least part of first and second paths of movement, respectively, of front and rear points on said top plate, said first path being about twice as long as said second path and being slightly convexly curved toward the front of said base plate and extending from a first point at substantially the lateral center of said base plate and ¼ the front-to-back seat dimension of said base plate to a second point spaced in said first direction, said second path extending substantially straight from a first point at substantially the lateral center of said base plate and ⅔ the front-to-back seat dimension of said base plate to a second point forward and partially in said first direction, said second point of said second path being substantially at the front-to-back center of said base plate, said top plate in said normal position establishing said front and rear points at the first points of said first and second paths, respectively, and said turned position of said top plate establishing said front and rear points at the second points of said first and second paths, respectively.

7. An auxiliary movable seat for an automobile seat, comprising, in combination, a base plate, straps connected to said base plate to fasten same fixedly to said automobile seat by encompassing said automobile seat and slightly compressing same in height, a top plate, first and second guideways in one of said plates, first and second sliding pivots pivoted to the other of said plates and slidable in said first and second guideways, respectively, said top plate being for seating support of a person, normal and turned positions of said top plate relative to said base plate and to said automobile seat with said turned position being in a first direction, said first guideway being approximately twice the length of said second guideway and said first and second guideways establishing first and second paths of movement, respectively, of front and rear points on said top plate, said first path being slightly convexly curved toward the front of said base plate and extending from a first point at substantially the lateral center of said base plate and ¼ the front-to-back seat dimension of said base plate to a second point spaced in said first direction, said second path extending substantially straight from a first point at substantially the lateral center of said base plate and ⅔ the front-to-back seat dimension of said base plate to a second point forward and about 20° in said first direction, said second point of said second path being substantially at the front-to-back center of said base plate, said top plate in said normal position establishing said front and rear points at the first points of said first and second paths, respectively, said turned position of said top plate establishing said front and rear points at the second points of said first and second paths, respectively, and said first path adjacent said first point extending in said first direction substantially perpendicular to the longitudinal axis of said automobile to prevent direct forward movement of said top plate relative to said base plate.

8. An auxiliary movable seat for an automobile seat, comprising, in combination, a base plate, first and second guideways in said base plate, a top plate, first and second sliding pivots pivoted to said top plate and slidable in said first and second guideways, respectively, normal and turned positions of said top plate relative to said base plate and to said automobile seat with said turned position being in a first direction, said first guideway being slightly convexly curved toward the front of said base plate and extending from a first point at substantially the lateral center of said base plate and ¼ the front-to-back seat dimension of said base plate to a second point spaced in said first direction, said second guideway extending substantially straight from a first point at substantially the lateral center of said base plate and ⅔ the front-to-back seat dimension of said base plate to a second point forward and about 20° in said first direction, said second point of said second guideway being substantially at the front-to-back center of said base plate, said top plate in said normal position establishing said first and second sliding pivots at the first points of said first and second guideways, respectively, and said turned position of said top plate establishing said first and second sliding pivots at the second points of said first and second guideways, respectively.

9. An auxiliary movable seat for an automobile seat, comprising, in combination, a base plate, straps connected to said base plate to fasten same fixedly to said automobile seat by encompassing said automobile seat and slightly compressing same in height, first and second guideways in said base plate, a top plate, first and second sliding pivots pivoted to said top plate and slidable in said first and second guideways, respectively, a cushion on said top plate for supporting a person, normal and turned positions of said top plate relative to said base plate and to said automobile seat with said turned position being in a first direction, said first guideway being approximately twice the length of said second guideway, said first guideway being slightly convexly curved toward the front of said base plate and extending from a first point at substantially the lateral center of said base plate and ¼ the front-to-back seat dimension of said base plate to a second point spaced in said first direction, said second guideway extending substantially straight from a first point at substantially the lateral center of said base plate and ⅔ the front-to-back seat dimension of said base plate to a second point forward and about 20° in said first direction, said second point of said second guideway being substantially at the front-to-back center of said base plate, said top plate in said normal position establishing said first and second sliding pivots at the first points of said first and second guideways, respectively, and said turned position of said top plate establishing said first and second sliding pivots at the second points of said first and second guideways, respectively.

10. An auxiliary movable seat for the left side of an automobile seat, comprising, in combination, a base plate, straps connected to said base plate to fasten same fixedly to said automobile seat by encompassing said automobile seat and slightly compressing same in height, first and second guideways in said base plate, a top plate, first and second sliding pivots pivoted to said top plate and slidable in said first and second guideways, respectively, a cushion on said top plate for supporting a person, normal and turned positions of said top plate relative to said base plate and to said automobile seat, said first guideway being approximately twice the length of said second guideway, said first guideway being slightly convexly curved toward the front of said base plate and extending from a first point slightly to the right of the lateral center of said base plate and ¼ the front-to-back seat dimension of said base plate to a second point generally to the left, said second guideway extending substantially straight from a first point slightly to the right of the lateral center of said base plate and ⅔ the front-to-back seat dimension of said base plate to a second point forward and about 20° to the left thereof, said second point of said second guideway being substantially at the front-to-back center of said base plate, said first guideway adjacent said first point extending to the left substantially at right angles to the longitudinal axis of the automobile to prevent direct forward movement of said top plate relative to said base plate, said top plate in said normal position establishing said first and second sliding pivots at the first points of said first and second guideways, respectively, and said turned position of said top plate establishing said first and second sliding pivots at the second points of said first and second guideways, respectively, with the geometric center of said top plate moving substantially in a straight line toward the left as said top plate is moved from said normal to said turned position.

References Cited in the file of this patent

UNITED STATES PATENTS

| | | |
|---|---|---|
| Re. 24,805 | Morrill | Mar. 29, 1960 |
| 2,744,565 | Zwick | May 8, 1956 |
| 2,821,240 | Morrill | Jan. 28, 1958 |

FOREIGN PATENTS

| | | |
|---|---|---|
| 25,563 | Great Britain | Feb. 19, 1914 |
| 799,685 | Great Britain | Aug. 13, 1958 |